(12) United States Patent
Ishizu

(10) Patent No.: US 10,440,250 B2
(45) Date of Patent: Oct. 8, 2019

(54) DATA PROCESSING APPARATUS HAVING AN INTERFACE TO WHICH A RECORDING MEDIUM HAVING A COMMUNICATION FUNCTION OF TRANSMITTING STORED DATA IS ATTACHABLE, DATA PROCESSING METHOD FOR SUCH DATA PROCESSING APPARATUS, AND STORAGE MEDIUM FOR STORING INSTRUCTIONS FOR SUCH DATA PROCESSING APPARATUS

(71) Applicant: CANON KABUSHIKI KAISHA, Tokyo (JP)

(72) Inventor: Akihiko Ishizu, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 94 days.

(21) Appl. No.: 15/380,897

(22) Filed: Dec. 15, 2016

(65) Prior Publication Data

US 2017/0180625 A1 Jun. 22, 2017

(30) Foreign Application Priority Data

Dec. 17, 2015 (JP) .................................. 2015-246634

(51) Int. Cl.
*H04N 5/232* (2006.01)
*H04N 5/38* (2006.01)
(Continued)

(52) U.S. Cl.
CPC .......... *H04N 5/23206* (2013.01); *H04N 5/38* (2013.01); *H04N 5/77* (2013.01); *H04N 5/772* (2013.01);
(Continued)

(58) Field of Classification Search
CPC .................................................. H04N 5/23206
See application file for complete search history.

(56) References Cited

U.S. PATENT DOCUMENTS 7,231,367 B1 * 6/2007 Alfvin ..................... G06Q 10/06
705/40
7,702,821 B2 * 4/2010 Feinberg ................. G06F 9/445
710/13

(Continued)

FOREIGN PATENT DOCUMENTS

JP 2013222244 A 10/2013

*Primary Examiner* — Gary C Vieaux
(74) *Attorney, Agent, or Firm* — Canon USA, Inc., IP Division

(57) ABSTRACT

In a case where a recording medium having a communication function is used for a digital still camera, noise may be generated and superposed on data to be recorded if data transmission is performed in imaging. On the other hand, in a case where data is transmitted in response to a user's request from an external apparatus, communication interruption degrades usability. The digital still camera obtains a product name of the recording medium from the recording medium so as to specify a transmission mode. If an automatic transmission mode for spontaneously performing data transmission is specified, data transmission is interrupted when imaging instruction is issued and furthermore the communication function of the recording medium may be disabled. On the other hand, if a manual transmission mode for performing data transmission in response to a request is specified, a communication state is maintained even if an imaging instruction is issued.

19 Claims, 13 Drawing Sheets

(51) Int. Cl.
    *H04N 5/77*           (2006.01)
    *H04N 5/907*        (2006.01)
    *H04W 84/12*       (2009.01)
    *H04W 88/08*       (2009.01)

(52) U.S. Cl.
    CPC ..... *H04N 5/907* (2013.01); *H04N 2201/0084* (2013.01); *H04W 84/12* (2013.01); *H04W 88/08* (2013.01)

(56) References Cited

U.S. PATENT DOCUMENTS

2013/0272284 A1* 10/2013 Tsumagari ............. G08C 17/00
                                                                        370/338
2018/0143933 A1*  5/2018 Seats ................... G06F 13/4068

* cited by examiner

FIG. 6

| CID : ProductName | TRANSMISSION MODE |
|---|---|
| AAA | AUTOMATIC TRANSMISSION |
| BBB | MANUAL TRANSMISSION |
| OTHERS | NO COMMUNICATION FUNCTION |

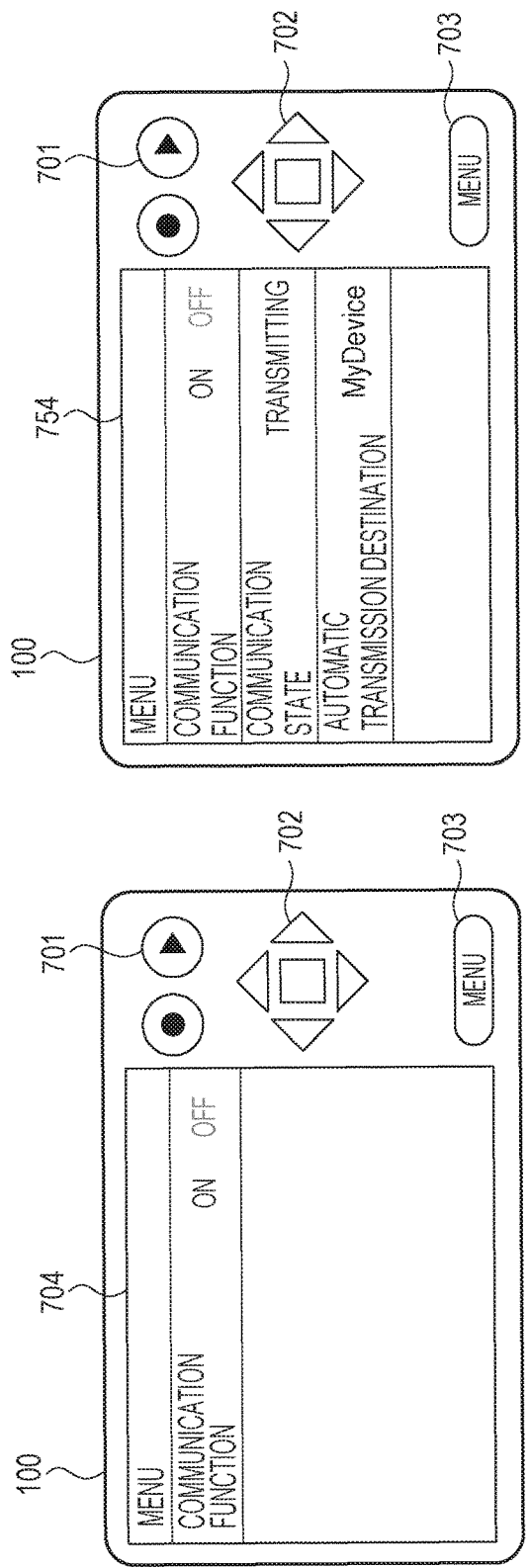

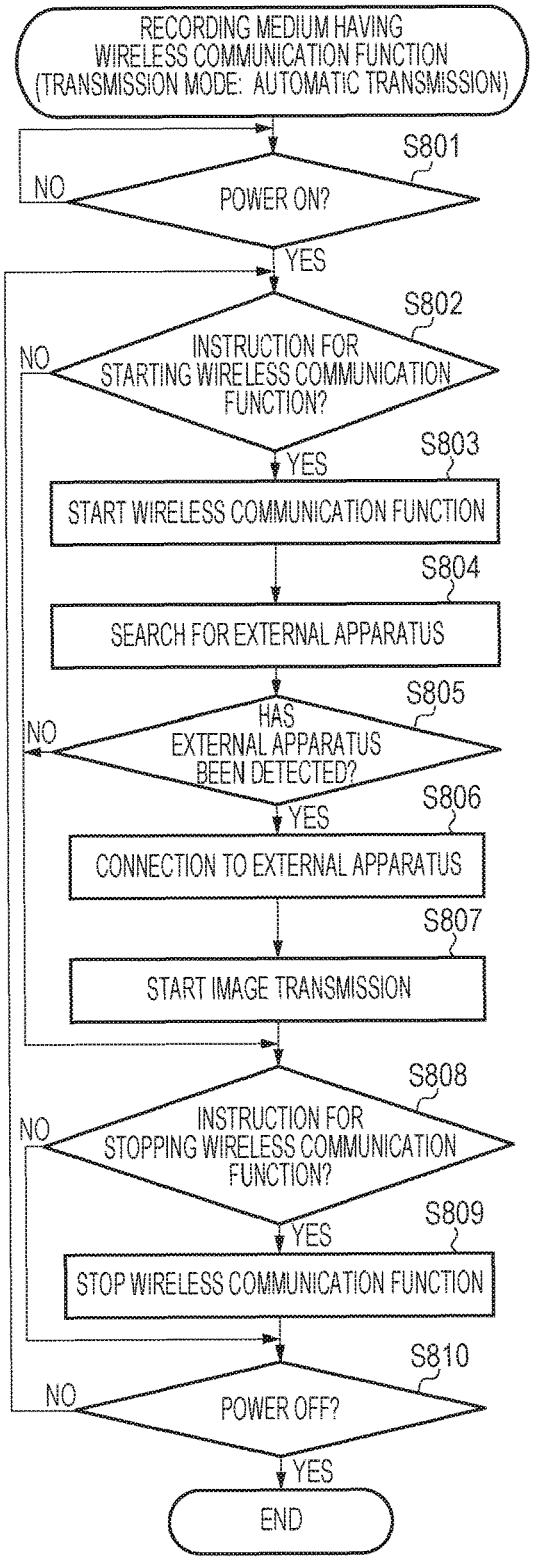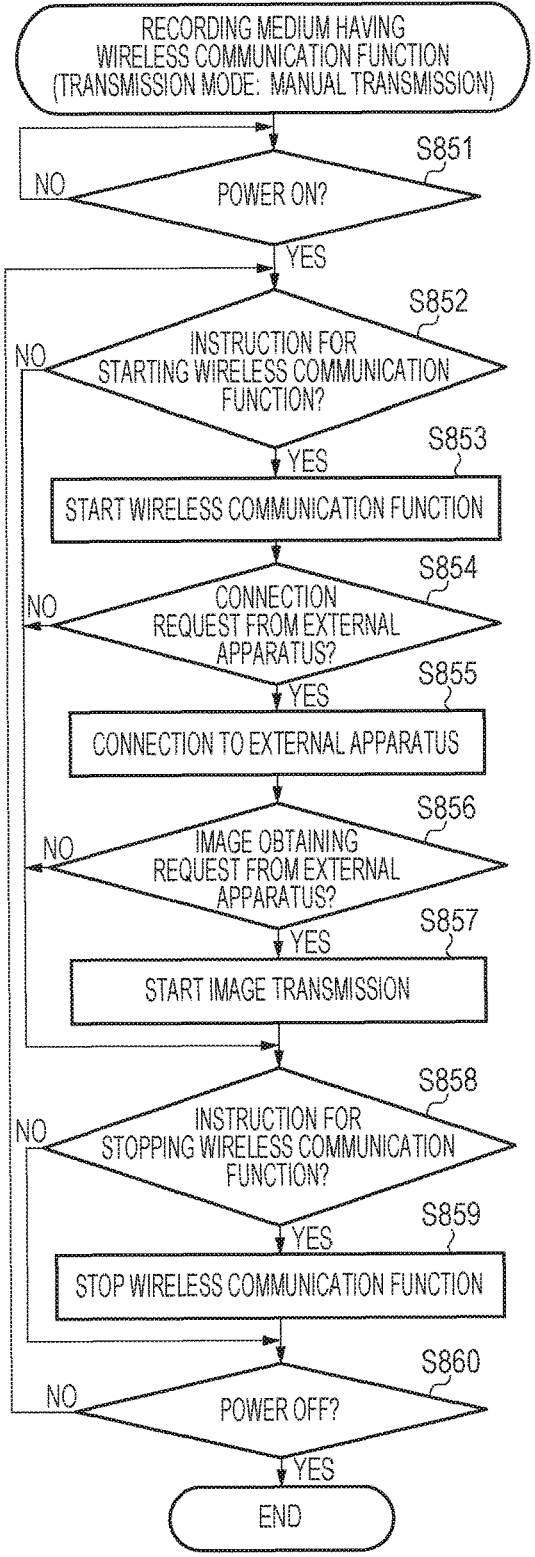

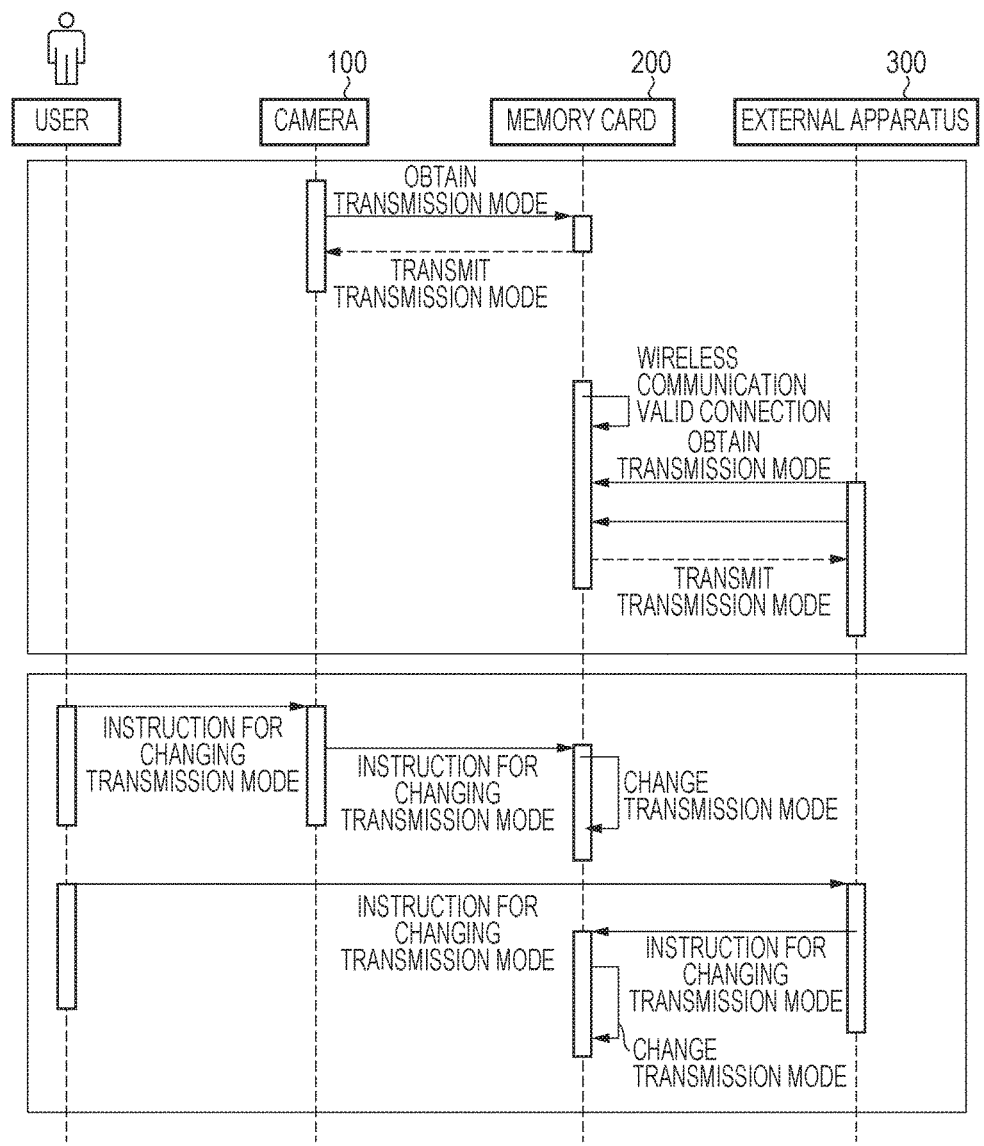

FIG. 11

| CID : ProductName | TRANSMISSION MODE |
|---|---|
| AAA | AUTOMATIC TRANSMISSION |
| BBB | MANUAL TRANSMISSION |
| CCC | AUTOMATIC TRANSMISSION/MANUAL TRANSMISSION |
| OTHERS | NO COMMUNICATION FUNCTION |

DATA PROCESSING APPARATUS HAVING AN INTERFACE TO WHICH A RECORDING MEDIUM HAVING A COMMUNICATION FUNCTION OF TRANSMITTING STORED DATA IS ATTACHABLE, DATA PROCESSING METHOD FOR SUCH DATA PROCESSING APPARATUS, AND STORAGE MEDIUM FOR STORING INSTRUCTIONS FOR SUCH DATA PROCESSING APPARATUS

BACKGROUND

Field

The present invention relates to a data processing apparatus to which a recording medium having a function of communicating with another communication apparatus through a network is attachable, a method for controlling the data processing apparatus, and a storage medium.

Description of the Related Art

As illustrated in Japanese Patent Laid-Open No. 2013-222244, a technique of attaching a recording medium having a communication function to a data processing apparatus, such as a digital still camera, and causing the recording medium to transmit image data stored in the recording medium to another apparatus through a wireless LAN network has been generally used. This function enables transmission of image data to another apparatus with ease.

SUMMARY

Various embodiments provide a data processing apparatus capable of changing a communication function at a time of image shooting depending on a type or a mode of an attached recording medium, the recording medium, and a program controlling the data processing apparatus and the recording medium.

According to various embodiments, a data processing apparatus includes an interface unit to which a recording medium having a communication function of transmitting stored data is attachable, a recording unit configured to record data captured in accordance with an imaging instruction in the recording medium in a case where the recording medium is attached, and a controller configured to specify a transmission mode of the recording medium in the case where the recording medium is attached and stop data transmission performed by the recording medium in accordance with the imaging instruction in a case of an automatic transmission mode for spontaneously transmitting data.

According to another aspect of various embodiments, a communication apparatus functioning as a recording medium attached to another apparatus includes a recording unit configured to record data in the recording medium, a communication unit having a communication function of transmitting data in one of a plurality of transmission modes, and a controller. The controller causes the communication unit to transmit data in one of the transmission modes corresponding to an instruction issued by the other apparatus and outputs the instructed transmission mode to the other apparatus in response to a request from the other apparatus.

Further features will become apparent from the following description of exemplary embodiments with reference to the attached drawings.

BRIEF DESCRIPTION OF THE DRAWINGS

FIG. 6 is a diagram illustrating a method for determining a transmission mode of the digital still camera according to the first embodiment.

FIGS. 7A and 7B are diagrams illustrating display screens of the digital still camera according to the first embodiment.

FIGS. 8A and 8B are flowcharts illustrating operations of the memory cards according to the first embodiment.

FIG. 9 is an image diagram illustrating a method for obtaining and changing a transmission mode of a memory card according to a second embodiment.

FIG. 11 is a diagram illustrating a method for determining a transmission mode of the digital still camera according to the second embodiment.

DESCRIPTION OF THE EMBODIMENTS

Hereinafter, embodiments will be described with reference to the accompanying drawings. Note that the embodiments described below are merely examples for realizing various embodiments and may be appropriately modified or changed in accordance with configurations of apparatuses to which the embodiments are applied and various conditions. Furthermore, the embodiments may be appropriately combined with each other.

First Embodiment

Configuration of Digital Still Camera

Figure 1:
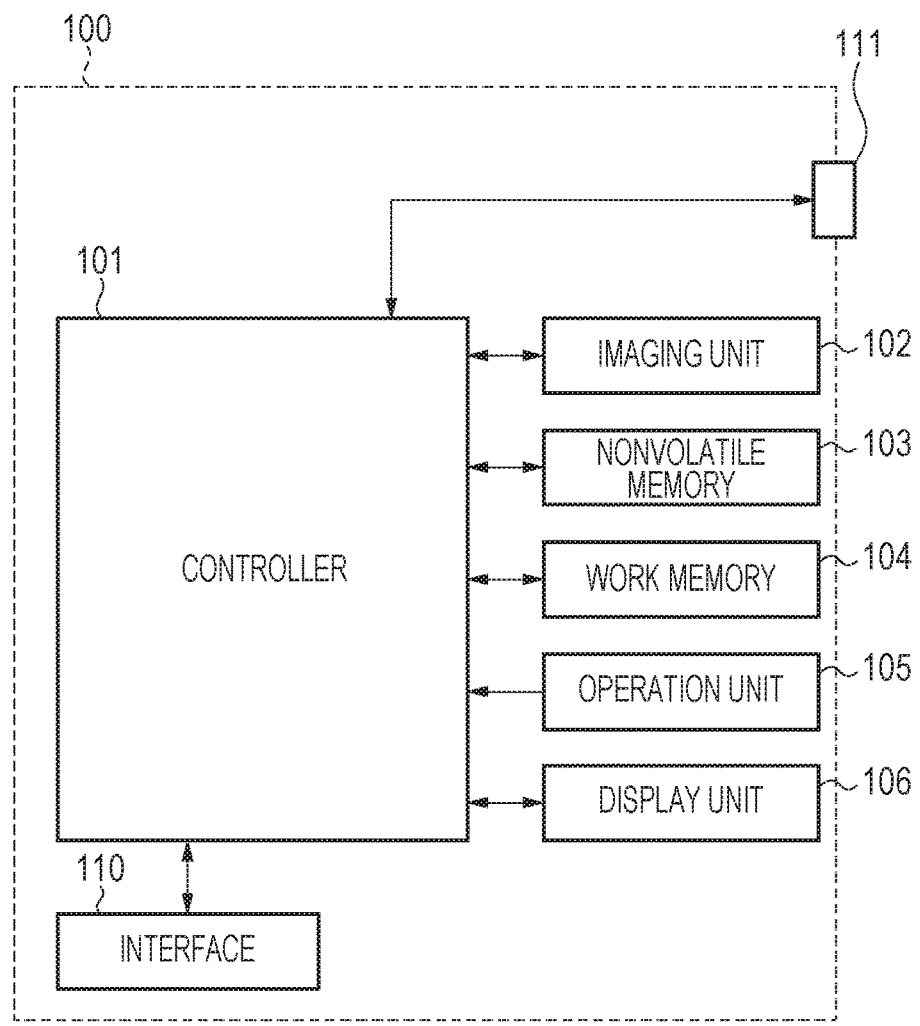
FIG. 1 is a block diagram illustrating a configuration of a digital still camera according to a first embodiment.

FIG. 1 is a block diagram illustrating a configuration of a digital still camera 100 which is an example of a data processing apparatus according to a first embodiment. Although a digital still camera is taken as an example of the data processing apparatus in this embodiment, the data processing apparatus is not limited to a digital still camera. The present embodiment is applicable to any apparatus to which a recording medium having a wireless communication function is attachable. For example, the data processing apparatus may be an information processing apparatus, such as a mobile media player, a so-called tablet device, or a personal computer.

A controller 101 controls units included in the digital still camera 100 in accordance with input signals and a program described below. The controller 101 includes a CPU, for example. Note that, instead of control by the controller 101 on the entire apparatus, a plurality of hardware components may share processing so as to control the entire apparatus.

An imaging unit 102 converts object light which is focused by a lens included in the imaging unit 102 into an electric signal, performs a noise reduction process and the like on the electric signal, and outputs digital data as image data. After the captured image data is stored in a buffer memory, the controller 101 performs a predetermined calculation on the image data, and the image data is recorded in a recording medium attached through an interface 110.

A nonvolatile memory 103 is an electrically-removable/recordable nonvolatile memory and stores the program described below to be executed by the controller 101.

A work memory 104 is used as a buffer memory for temporarily storing image data captured by the imaging unit 102, a memory for image display of a display unit 106, a work area of the controller 101, and the like.

An operation unit 105 is used to receive an instruction issued by a user to the digital still camera 100. The operation unit 105 includes operation members, such as a power button for instructing turning on or off of the digital still camera 100 by the user, a release switch for instructing imaging, and a reproduction button for instructing reproduction of the image data. The operation unit 105 further includes a touch panel formed on the display unit 106 described below. Note that the release switch includes switches SW1 and SW2. When the release switch is brought into a so-called half-stroke state, the switch SW1 is turned on. In this state, an instruction for performing imaging preparation, including an autofocus (AF) process, an auto exposure (AE) process, an auto white balance (AWB) process, a pre-flashing (EF) process, and the like is received. When the release switch is brought into a so-called full-stroke state, the switch SW2 is turned on. In this state, an instruction for performing imaging is received.

The display unit 106 performs display of a view finder image at a time of imaging, display of captured image data, display of characters for an interactive operation. The digital still camera 100 may not incorporate the display unit 106. The digital still camera 100 is connectable to an internal display unit 106 or an external display unit 106 and at least has a display control function of controlling display of the display unit 106.

The interface 110 has a function of attaching/detaching the recording medium and records image data output from the imaging unit 102 in the recording medium. The digital still camera 100 may perform a normal image process, a normal reproduction process, and the like irrespective of an attached recording medium and record an image in the recording medium through the interface 110.

A communication unit 111 is an interface for connection to another apparatus. The digital still camera 100 of this embodiment may perform transmission and reception of data with an external apparatus through the communication unit 111.

The digital still camera 100 has been described hereinabove. Next, a memory card 200 which is an example of the recording medium will be described.

Configuration of Recording Medium

Figure 2:
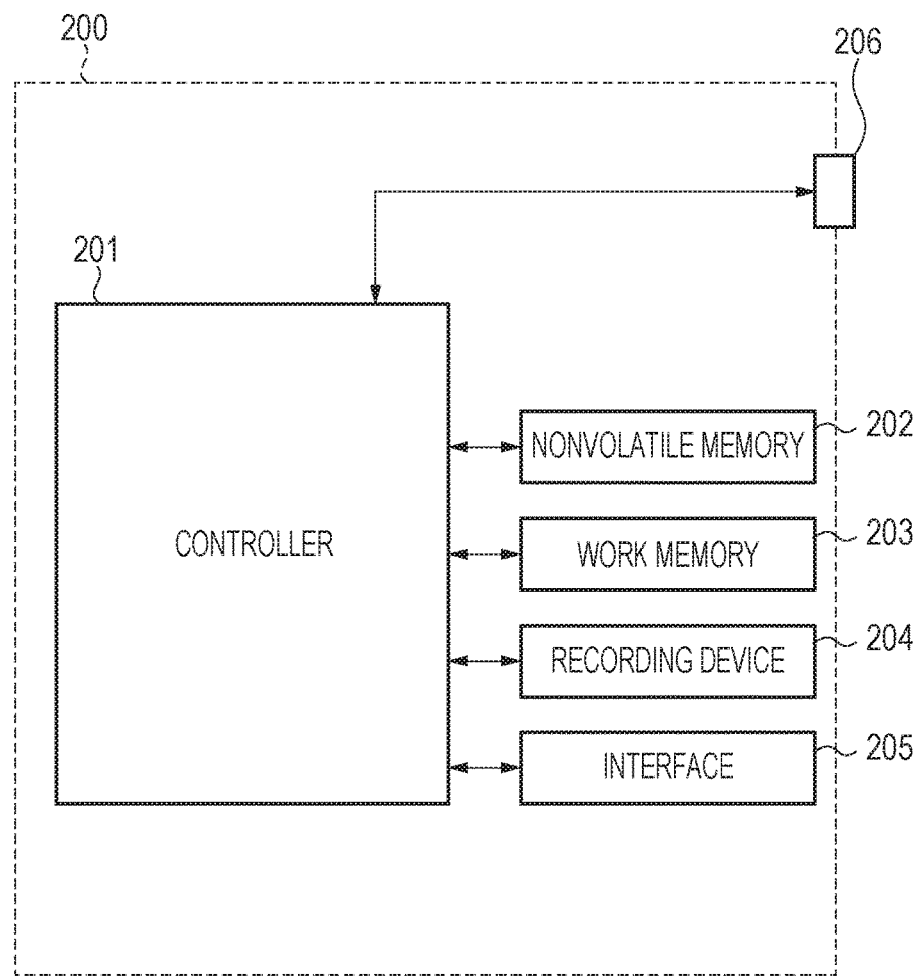
FIG. 2 is a block diagram illustrating a configuration of a memory card according to the first embodiment.

FIG. 2 is a block diagram illustrating a configuration of the memory card 200 which is an example of the recording medium according to this embodiment. Although a plurality of types of recording medium having a communication function exist as described below, such recording media have substantially the same main hardware configuration, and therefore, the plurality of types of recording medium are collectively illustrated in FIG. 2.

A controller 201 controls units included in the memory card 200 in accordance with input signals supplied through an interface 205 and a program described below. Note that, instead of control by the controller 201 on the entire apparatus, a plurality of hardware components may share processing so as to control the entire apparatus.

A nonvolatile memory 202 is an electrically-removable/recordable nonvolatile memory and stores the program described below to be executed by the controller 201. The nonvolatile memory 202 further stores identification information which identifies a product, such as a product name of the recording medium, in a predetermined storage position.

A work memory 203 is used as a buffer memory which temporarily stores image data supplied from the data processing apparatus through the interface 205, a work area of the controller 201, and the like.

A recording device 204 is used to record data supplied from the data processing apparatus through the interface 205.

The interface 205 has a function of connection to the data processing apparatus through the interface 110, and the controller 201 records data supplied from the data processing apparatus through the interface 205 in the recording device 204. Furthermore, the controller 201 reads data from the recording device 204 in response to a data reading request from the data processing apparatus and outputs the data through the interface 205.

A communication unit 206 is an interface for connection to an external apparatus. The memory card 200 of this embodiment may perform transmission and reception of data with the external apparatus through the communication unit 206. Note that the communication unit 206 includes an interface for communication with the external apparatus through a wireless local area network (LAN) in this embodiment. The controller 201 realizes wireless communication with the external apparatus by controlling the communication unit 206. Note that the communication method is not limited to the wireless LAN.

The memory card 200 of this embodiment may be operated as a slave apparatus in an infrastructure mode. In a case where the memory card 200 is operated as a slave apparatus, the memory card 200 may be connected to a surrounding access point (hereinafter referred to as an "AP") so as to be connected to a network formed by the AP. Although the memory card 200 of this embodiment is a type of AP, the memory card 200 may be operated as a simply-configured AP (hereinafter referred to as a "simple AP") having a limited function. Note that the AP of this embodiment is an example of a relay apparatus. When the memory card 200 is operated as a simple AP, the memory card 200 forms a network. A surrounding apparatus of the memory card 200 recognizes the memory card 200 as an AP and may be connected to the network formed by the memory card 200. It is assumed that a program for operating the memory card 200 as described above is stored in the nonvolatile memory 202. Furthermore, the memory card 200 may perform communication in an ad hoc mode.

Configuration of Cellular Phone

Figure 3:
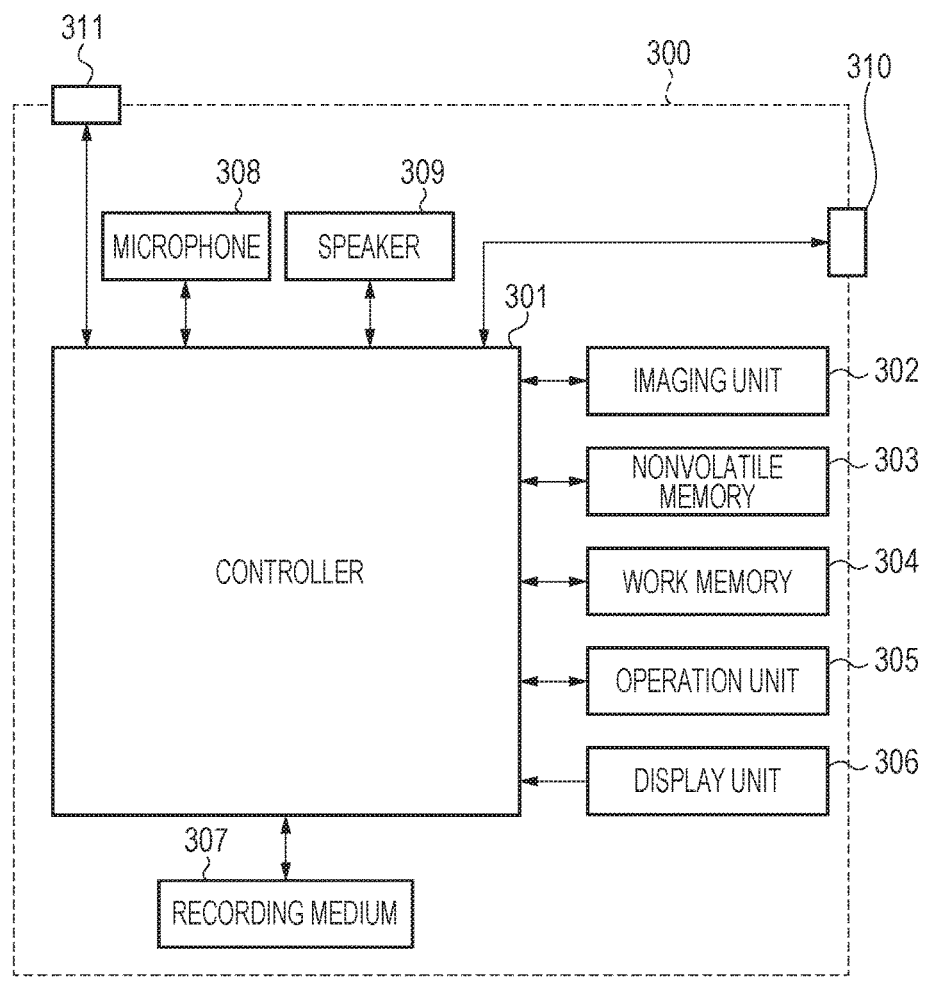
FIG. 3 is a block diagram illustrating a configuration of a cellular phone according to the first embodiment.

FIG. 3 is a block diagram illustrating a configuration of a cellular phone 300 which is an example of a communication apparatus according to this embodiment. Although a cellular phone is taken as an example of the communication apparatus in this embodiment, the communication apparatus is not limited to a cellular phone. For example, the communication apparatus may be an information processing apparatus, such as a digital still camera having a wireless function, a mobile media player, a so-called tablet device, a personal computer, or a smart phone.

A controller 301 controls units included in the cellular phone 300 in accordance with input signals and a program described below. Note that, instead of control by the controller 301 on the entire apparatus, a plurality of hardware components may share processing so as to control the entire apparatus.

An imaging unit 302 converts object light which is focused by a lens included in the imaging unit 302 into an electric signal, performs a noise reduction process on the electric signal, and outputs digital data as image data. After the captured image data is stored in a buffer memory, the controller 301 performs a predetermined calculation on the image data, and the image data is recorded in a recording medium 307.

A nonvolatile memory 303 is an electrically-removable/recordable nonvolatile memory and stores various programs to be executed by the controller 301. It is assumed that a program for communication with the digital still camera 100 is also stored in the nonvolatile memory 303 and installed as a camera communication application. Note that processing performed by the cellular phone 300 of this embodiment is realized by reading the program offered by the camera communication application. Note that it is assumed that the camera communication application has a program for utilizing basic functions of an operating system (OS) installed in the cellular phone 300. The OS of the cellular phone 300 may include a program for realizing the processing of this embodiment.

A work memory 304 is used as a buffer memory for temporarily storing image data generated by the imaging unit 302, a memory for image display of a display unit 306, a work area of the controller 301, and the like.

An operation unit 305 is used to receive an instruction issued to the cellular phone 300 by a user. The operation unit 305 includes operation members, such as a power button for issuing an instruction for turning on or off the cellular phone 300 by the user and a touch panel formed in the display unit 306.

The display unit 306 performs display of image data, display of characters for an interactive operation, and the like. It is not necessarily the case that the cellular phone 300 incorporates the display unit 306. The cellular phone 300 is connectable to the display unit 306 and at least has a display control function of controlling display of the display unit 306.

The recording medium 307 may record image data output from the imaging unit 302. The recording medium 307 may be attachable to the cellular phone 300 or incorporated in the cellular phone 300. Specifically, the cellular phone 300 at least has a unit for accessing the recording medium 307.

A communication unit 310 is an interface for connection to an external apparatus. The cellular phone 300 of this embodiment may perform transmission and reception of data with an external apparatus, such as the memory card 200, through the communication unit 310. Note that the communication unit 310 includes an interface for communication with the external apparatus through a wireless LAN in this embodiment. The controller 301 realizes wireless communication with the external apparatus by controlling the communication unit 310. The cellular phone 300 of this embodiment may be operated at least as a slave apparatus in the infrastructure mode and connected to a network formed by a surrounding AP.

A public network connection unit 311 is an interface used when public wireless communication is performed. The cellular phone 300 may make a telephone call to another apparatus and perform data communication through the public network connection unit 311. In the telephone call, the controller 301 inputs and outputs an audio signal through a microphone 308 and a speaker 309. In this embodiment, the public network connection unit 311 includes an interface for 3G communication. The communication method is not limited to 3G communication, and other communication methods using LTE, WiMAX, ADSL, FTTH, and so-called 4G may be used. Furthermore, it is not necessarily the case that each of the communication unit 310 and the public network connection unit 311 is configured as independent hardware, and a single antenna may function as both of the communication unit 310 and the public network connection unit 311. The cellular phone 300 has been described hereinabove. Note that the external apparatus may not include a communication unit for wireless communication, and may be connected to a wired network through a wired LAN interface, for example, so as to be further connected to a wireless LAN access point through the wired network. In this case, the wireless LAN may be connected to the memory card 200 in the infrastructure mode.

Transmission Mode

Figure 4A:
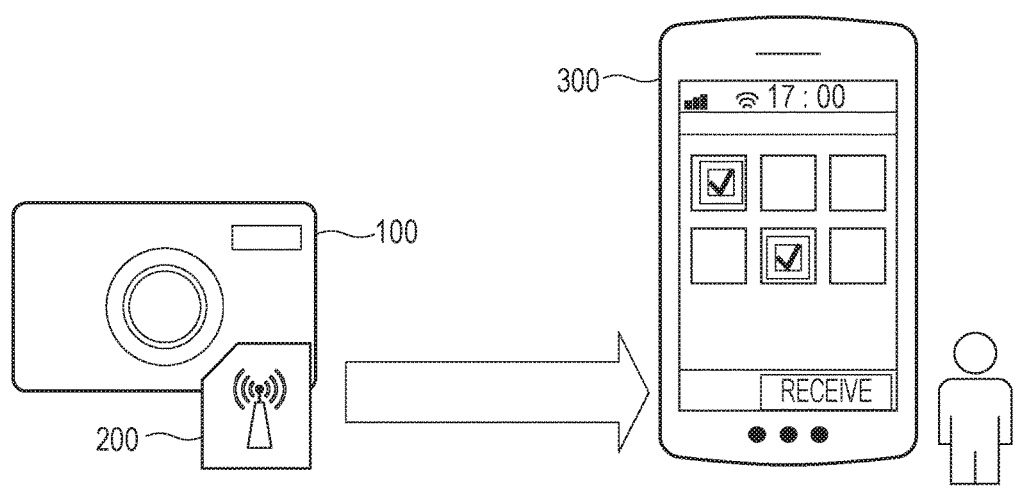
FIGS. 4A and 4B are diagrams illustrating a difference between transmission modes of memory cards.
Figure 4B:
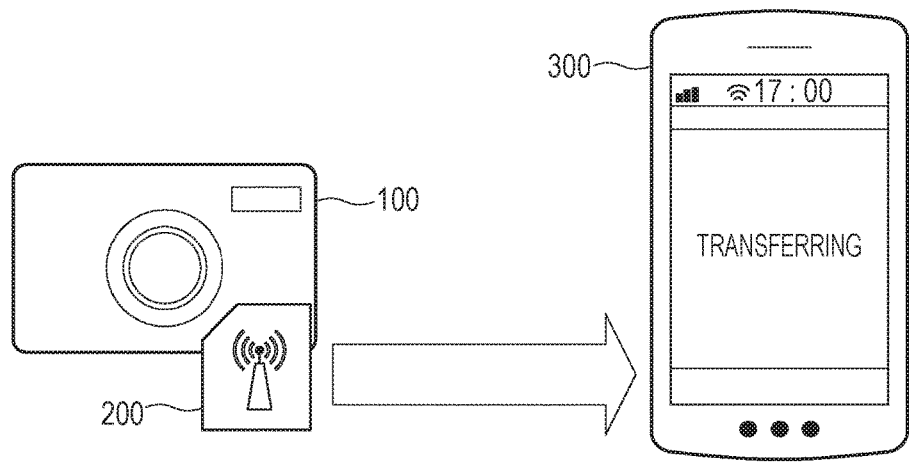

FIGS. 4A and 4B are image diagrams illustrating different transmission modes of two types of recording medium.

FIG. 4A is an image diagram illustrating a case of a manual transmission mode of a recording medium. A memory card 200 of manual transmission is connected to an apparatus of a connection destination, such as the cellular phone 300, in response to a connection request transmitted from the cellular phone 300. Thereafter, the memory card 200 transmits a specified file to the apparatus in response to specifying of the file and a transfer request of the file supplied from the apparatus of the connection destination.

FIG. 4B is an image diagram illustrating a case of an automatic transmission mode of a recording medium. A memory card 200 of automatic transmission records information on an apparatus of a connection destination in a predetermined storage location in advance. When the recording medium is powered, it is determined whether a file to be transferred is included in a predetermined folder. When the file to be transferred is included, the apparatus of the connection destination which has been recorded is searched for, and when the apparatus of the connection destination is detected, connection is made to the apparatus and the file is transmitted to the apparatus. Here, if wireless connection has been established, communication is performed through the wireless connection. However, if the wireless connection has been lost, wireless connection is newly established, and thereafter, the file is transmitted to the apparatus of the specified connection destination. In this way, if the transmission mode of the recording medium is the automatic transmission, unlike the recording medium of the manual transmission, a file to be transmitted is not selected by the device of the connection destination but is specified by the recording medium. A method for specifying a file is determined in advance. For example, a file to be transmitted may be specified by various methods, such as a method for transmitting all recorded files and a method for making marks on files which have been transmitted and transmitting only files which have not been transmitted. Note that one of the transmission modes for transmitting a file, that is, the automatic transmission and the manual transmission, is selected in accordance with a type of the recording medium in this embodiment which may be specified by the product name of the recording medium.

In the recording medium in the automatic transmission mode, the recording medium determines a transmission of an image to the apparatus of the connection destination which has been recorded, and therefore, even if the transfer is interrupted, the transmission of the image may be restarted without a user operation. On the other hand, in the recording medium in the manual transmission mode, the recording medium does not determine a file to be transmitted but an image is selected by the apparatus of the connection destination and the image is transmitted. Therefore, a case where a user operation is waited for a long period of time in a state in which the connection is maintained may be considered. Accordingly, in the recording medium in the manual transmission mode, if disconnection occurs every time imaging is performed, the user operation may not be performed. Therefore, in this embodiment, communication control in imaging is changed depending on a transmission mode of the recording medium.

Hereinafter, a method for controlling a communication function when the memory card 200 is attached to the digital still camera 100 according to the first embodiment and communication is performed with the cellular phone 300 will be described with reference to FIGS. 5, 6, 7A, 7B, 8A, and 8B.

Processing of Digital Still Camera

Figure 5:
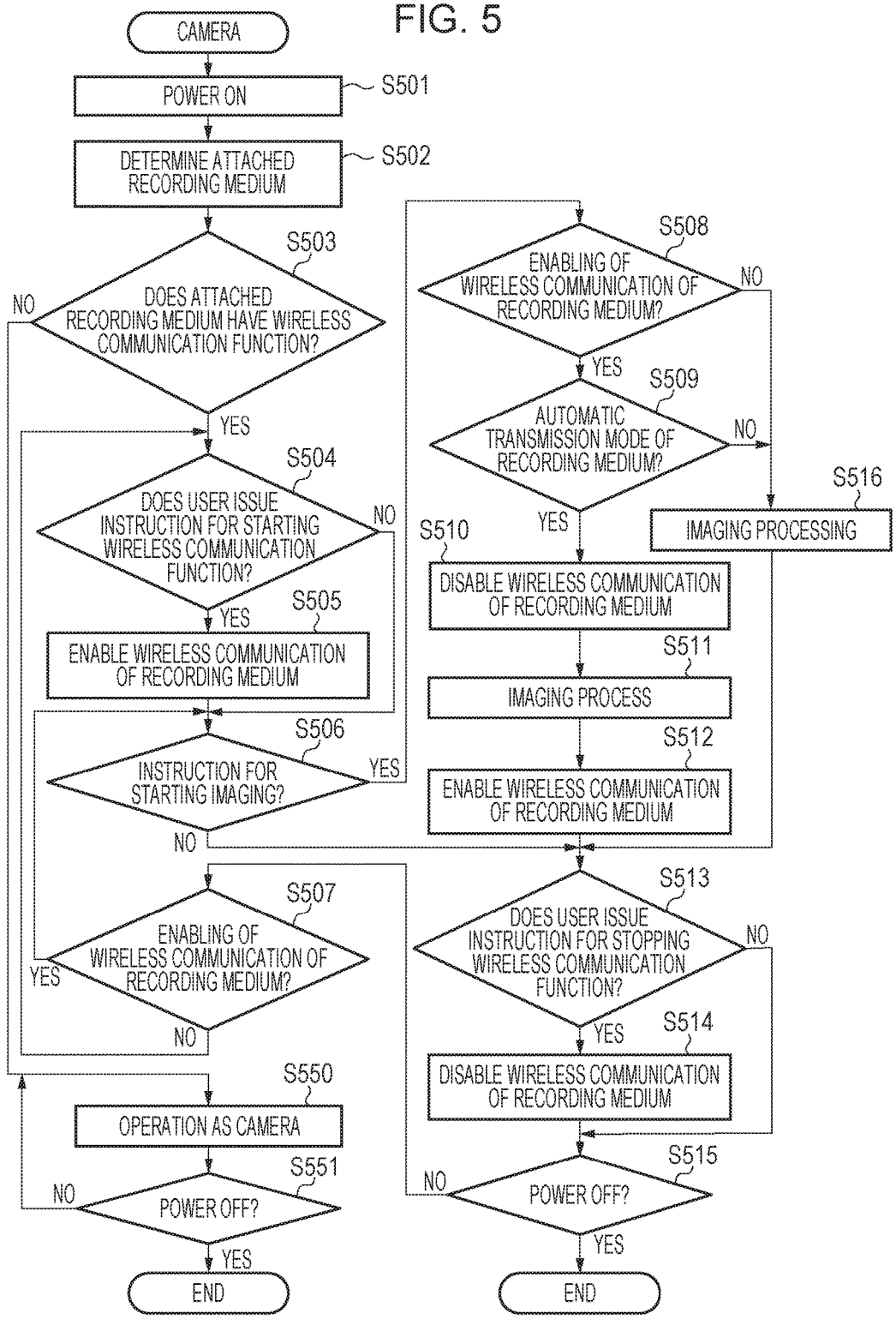
FIG. 5 is a flowchart illustrating an operation of the digital still camera according to the first embodiment.

FIG. 5 is a flowchart of an operation of the digital still camera 100 when the memory card 200 is attached to the digital still camera 100 according to the first embodiment and communication is performed with the cellular phone 300. In this embodiment, two types of recording medium having different transmission modes may be attached to the digital still camera 100. Furthermore, a recording medium which does not have the communication function may also be attached to the digital still camera 100. A procedure of FIG. 5 is executed by the controller 101.

First, in step S501, when the user operates the operation unit 105, the digital still camera 100 is powered and the processing is started. In step S502, the controller 101 determines a transmission mode of the memory card 200 attached to the digital still camera 100 through the interface 110 and records the determined transmission mode in the work memory 104. The determination of a transmission mode may be performed by searching a correspondence table including the relationships between product names (CID: ProductName) recorded in the nonvolatile memory 103 of the digital still camera 100 and transmission modes for the product names of the memory card 200, for example. The method for determining a transmission mode will be described with reference to FIG. 6.

Correspondence Table

FIG. 6 is an example of the correspondence table in which a product name (CID: ProductName) of the memory card 200 of the memory card 200 is associated with a transmission mode. The correspondence table illustrated in FIG. 6 is recorded in the nonvolatile memory 103 of the digital still camera 100 in advance, and the correspondence table is searched for a product name read from the nonvolatile memory 202 of the memory card 200 so that a transmission mode corresponding to the product name is specified. For example, in a case where the product name of the memory card 200 is "AAA", it is determined that a transmission mode of the memory card 200 is the automatic transmission. Furthermore, in a case where the product name is "BBB", it is determined that a transmission mode of the memory card 200 is the manual transmission. On the other hand, if the product name is not "AAA" nor "BBB", that is, the product name obtained from the nonvolatile memory 202 is not included in the correspondence table, it is determined that the nonvolatile memory 202 is a recording medium which does not have the communication function. This determination is performed based on a result of the determination as to whether the product name matches one of the product names included in the correspondence table. However, the scope of the present disclosure is not limited to this. The determination may be made based on a result of a determination as to whether a number of leading characters or a number of trailing characters of the product name match a predetermined character string. Although a product name of a recording medium is used as a determination reference in this embodiment, the scope of the present disclosure is not limited to this. For example, a file for setting a transmission mode may be stored in a predetermined folder of the recording medium, and a transmission mode may be determined with reference to the file. In this case, if the predetermined folder does not include the file for setting a transmission mode, it is determined that the recording medium does not have the communication function.

In step S503, when determining that the memory card 200 has the communication function, the controller 101 proceeds to step S504, and otherwise, the controller 101 proceeds to step S550. In step S550, the digital still camera 100 does not control the communication function of the memory card 200 but only operates as a normal camera which performs imaging, image recording, and the like. Accordingly, the digital still camera 100 does not have a characteristic of various embodiments of the present disclosure, and therefore, a detailed description thereof is omitted. On the other hand, when determining that the memory card 200 has the communication function, the digital still camera 100 changes menu display for setting the communication function of the memory card 200 in accordance with the transmission mode of the memory card 200 attached through the interface 110. In a menu, an on/off state of the communication function may be displayed in the manual transmission mode, and a communication state of the memory card 200 and a transmission destination of the automatic transmission may be displayed in addition to the on/off state of the communication function in the automatic transmission mode. An example of the menu display will be described with reference to FIGS. 7A and 7B.

Example of Menu Display

FIGS. 7A and 7B are diagrams illustrating the menu display for setting the communication function of the memory card 200 of the digital still camera 100.

FIG. 7A is a diagram illustrating the menu display displayed in a case where the transmission mode of the memory card 200 attached to the digital still camera 100 is the manual transmission.

Buttons 701 to 703 are included in the operation unit 105 which accepts user operations.

The button 701 is a power button used to perform switching between ON and OFF states of power of the digital still camera 100. The button 702 is used to change a setting and perform an operation for switching a cursor displayed in the display unit 106. In addition to movement buttons indicating upper, lower, left, and right directions, a determination button is arranged at a center. The button 703 is a menu button used to display a menu for changing a setting in the display unit 106. When the menu button 703 is pressed, a menu screen 704 or a menu screen 754 is displayed. The menu screen 704 displays an enabling state or a disabling state of the communication function of the memory card 200, and in addition, performs display for setting the communication function by operating the button 702. Although the setting and the display are performed using the buttons 701 to 703 in this embodiment, the scope of the present disclosure is not limited to this. For example, if the display unit 106 is a touch panel, a setting may be changed by operating the menu screen 704. Although the communication function is "ON", that is, in an ON state in the example of FIG. 7A, the setting of the communication function may be changed from "ON" to OFF" by selecting a displayed column of the communication function, for example, by the determination button, operating a certain one of the movement buttons so that the communication function corresponds to "OFF", that is, the communication function is brought into an OFF state, and pressing the determination button again. Switching from "OFF" to "ON" may be similarly performed. This operation is merely an example of the operation procedure.

FIG. 7B is a diagram illustrating the menu display displayed in a case where the transmission mode of the memory card 200 attached to the digital still camera 100 is the automatic transmission. The buttons 701 to 703 are the same as those of FIG. 7A, and therefore, descriptions thereof are omitted. The screen 754 displays, in addition to the components displayed in the screen 704, a communication state of the memory card 200 and a transmission destination. In the case of the automatic transmission mode, the transmission is interrupted as the communication state every time imaging is performed, and therefore, the communication state is displayed. Although the communication state is displayed only in the automatic transmission mode in this embodiment, the communication state may be displayed in the manual transmission mode. Furthermore, in the automatic transmission mode, information on a connection destination apparatus is registered in advance, and therefore, the registered automatic transmission destination is displayed. In FIG. 7B, the switching between ON and OFF of the communication function may be performed similarly to the case of the manual transmission mode. In addition, in a case where a plurality of apparatuses are registered as automatic transmission destinations, for example, one of the apparatuses may be selected as a connection destination. Furthermore, the automatic transmission destination may be newly registered in the memory card 200 by operating the digital still camera 100.

Referring back to FIG. 5, a loop starting from step S504 and returning back to step S504 through step S506, step S513, step S515, and step S507 is formed for waiting for an instruction issued by a user operation unless otherwise specified. In this loop, an instruction issued by a user operation is waited, and if an instruction is input, a process corresponding to the instruction is performed in the procedure of FIG. 5. The waiting for an instruction may be performed not only using the loop but also with a configuration in which the process in FIG. 5 is restarted in accordance with an instruction after the process is stopped, and the process may be branched in accordance with content of the instruction.

In step S504, when the controller 101 detects that an instruction for enabling the communication function of the memory card 200 has been issued by the user operating the operation unit 105 in the menu screen described above, the process proceeds to step S505. Subsequently, in step S505, the controller 101 issues an instruction for enabling the communication function to the memory card 200 through the interface 110. Although the communication function of the memory card 200 is enabled or disabled in response to a user operation in this embodiment, the scope of the present disclosure is not limited to this. For example, a setting value indicating enabling or disabling of the communication function may be recorded in the nonvolatile memory 103, and when it is determined that the memory card 200 has the communication function, the controller 101 may read the setting value from the nonvolatile memory 103 and issue an instruction to the memory card 200. Furthermore, although the communication function of the memory card 200 is started in response to an instruction supplied from the digital still camera 100 in this embodiment, the scope of the present disclosure is not limited to this. For example, an initial value of the operation of the communication function of the memory card 200 may be recorded in the nonvolatile memory 202, and the controller 201 may read the initial value of the communication function recorded in the nonvolatile memory 202 when the memory card 200 is powered so as to perform switching between enabling and disabling of the communication function. As described above, in the configuration in which the memory card 200 makes a determination for changing the communication function, an instruction supplied from the digital still camera 100 in step S504 is not required. In a case of a recording medium which does not require such an instruction, the process proceeds to step S506 if the recording medium has been attached.

Next, in step S506, when determining that an instruction for starting imaging has been issued, the controller 101 proceeds to step S508. The instruction for starting imaging is issued when a release button is pressed, for example. If imaging is performed during transfer, noise may be generated. The noise interferes with sound when moving image is captured. To prevent generation of noise, the communication function may be turned off in the imaging. However, sudden interruption of transmission of an image may cause problems. In particular, in a case of the recording medium performing the manual transmission as illustrated in FIG. 4A, a user operation may be waited for a long period of time while connection is maintained, and therefore, if disconnection occurs every time imaging is performed, a user operation may not be performed. Therefore, in this embodiment, communication is continued in the imaging in the recording medium of the manual transmission, whereas communication is disabled in imaging in the recording medium of the automatic transmission. A control method thereof will be described in step S508 to step S516.

In step S508, the controller 101 determines whether the communication function of the memory card 200 is enabled through the interface 110. When the communication function is not enabled, the communication function is not required to be disabled. Therefore, in step S516, the controller 101 performs a predetermined imaging process through the imaging unit 102 and stores image data in the memory card 200 through the interface 110. On the other hand, when the communication function is enabled, the process proceeds to step S509. In step S509, the controller 101 reads a transmission mode of the memory card 200 from the work memory 104. In the case of the manual transmission mode of the memory card 200, the communication function is not disabled so that a user operation is not prevented from being performed on the apparatus of a connection destination. In step S516, the controller 101 performs the predetermined imaging process through the imaging unit 102 and stores image data in the memory card 200 through the interface 110.

In the case of the automatic transmission mode of the memory card 200, the process proceeds to step S510. In step S510, the controller 101 issues an instruction for disabling the communication function of the memory card 200 through the interface 110 so that noise is not generated in a captured image due to the communication. In step S511, the controller 101 performs a predetermined imaging process through the imaging unit 102 and stores image data in the memory card 200 through the interface 110. Thereafter, in step S512, the controller 101 issues an instruction for enabling the communication function to the memory card 200 again through the interface 110 so that the communication is restarted. Note that, if an imaging interval is short, the imaging process may be terminated when a predetermined period of time elapses after image data or the like is stored since it is difficult to enable the communication function for a short time and an effect is small. In this case, the operation in step S511 is performed until the predetermined period of time elapses. Note that, when the communication function is disabled, an established connection is cancelled and communication being performed is interrupted. On the other hand, when the communication function is enabled, a connection may also be established again in addition to the enabled communication function.

In step S513, when the controller 101 detects that an instruction for disabling the communication function of the memory card 200 has been issued by the user operating the operation unit 105, the process proceeds to step S514. In step S514, the controller 101 performs an instruction for disabling the communication function to the memory card 200 through the interface 110. In step S515, when the controller 101 detects power-off of the digital still camera 100 performed by the user operating the operation unit 105, the process is terminated. Thereafter, the power is off.

Process of Memory Card

FIGS. 8A and 8B are flowcharts of operations of the memory cards 200 when the memory cards 200 are attached to the digital still camera 100 and communication is performed with the cellular phone 300. The memory cards 200 have the different transmission modes as described above. Hereinafter, communication control methods of the memory cards 200 in the different transmission modes will be described. The recording medium which does not have a communication function only has a function of inputting/outputting and recording data output from the digital still camera 100 through an interface, and therefore, a description thereof is omitted.

Automatic Transmission

FIG. 8A is a flowchart illustrating an operation of the memory card 200 in the automatic transmission mode. As described above, although the memory card 200 in the automatic transmission mode requires recording of information on an apparatus of a connection destination in the nonvolatile memory 202, it is assumed that the information on the apparatus of the connection destination is recorded before this flowchart is executed.

First, in step S801, when power-on of the controller 201 is detected, processing is started. In step S802, when the controller 201 detects an instruction for starting the communication function supplied from the digital still camera 100, the process proceeds to step S803. Although the communication function is started in response to the instruction supplied from the digital still camera 100 in this embodiment, the scope of the present disclosure is not limited to this. For example, an initial value of the operation of the communication function of the memory card 200 may be recorded in the nonvolatile memory 202, and the controller 201 may read the initial value of the communication function recorded in the nonvolatile memory 202 when the memory card 200 is powered so as to perform switching between enabling and disabling of the communication function. In such an embodiment, the process proceeds to step S803 while the digital still camera 100 does not issue an instruction in step S802. In step S803, the controller 201 enables the communication function of the communication unit 206 so that the controller 201 may communicate with the cellular phone 300 through the communication unit 206. In step S804, the controller 201 reads the information on the apparatus of the connection destination from the nonvolatile memory 202 and searches for the apparatus. Here, as a method for searching for the apparatus of the connection destination, the memory card 200 may perform search notification in a local area network or may perform advertising notification in the local area network so that the memory card 200 is detected by the apparatus of the connection destination.

When detecting the cellular phone 300 which is the apparatus of the connection destination through the communication unit 206 in step S805, the controller 201 is connected to the cellular phone 300 in step S806. When the connection is to be made, a connection request may be transmitted form the memory card 200 to the cellular phone 300 for the connection, or a connection request may be transmitted form the cellular phone 300 to the memory card 200 for the connection. In step S807, the controller 201 starts transmission of an image to the cellular phone 300 through the communication unit 206. Here, a file to be transmitted is not determined by selecting the file to be transferred in the apparatus of the connection destination but is determined when the controller 201 specifies the file to be transmitted. Thereafter, transmission of the file is started. As an example of a file specifying method, the controller 201 determines whether a file to be transferred is included in a predetermined folder of the recording device 204, and when the determination is affirmative, the target file is transmitted. However, the scope of the present disclosure is not limited to this. For example, all files included in the predetermined folder of the recording device 204 may be transmitted, or only files of a specific file format may be transmitted. In step S808, when the controller 201 detects an instruction for stopping the communication function supplied from the digital still camera 100, the process proceeds to step S809. Furthermore, although the communication function is stopped in response to the instruction supplied from the digital still camera 100 in this embodiment, the scope of the present disclosure is not limited to this. For example, the communication function may be stopped after all files to be transferred are transmitted. In step S809, the controller 201 disables the communication function of the communication unit 206 so that the controller 201 may not communicate with the cellular phone 300 through the communication unit 206. In step S810, when power-off is detected, the process is terminated.

The flowchart illustrating the operation of the memory card 200 in the automatic transmission mode has been described hereinabove.

Manual Transmission

FIG. 8B is a flowchart illustrating an operation of the memory card 200 in the manual transmission mode.

An operation in step S851 and step S852 is the same as the operation in step S801 and step S802 in the operation of the memory card 200 in the automatic transmission mode described above, and therefore, a description thereof is omitted. In step S853, the controller 201 starts an operation as the AP through the communication unit 206 and forms a network. Surrounding apparatuses of the memory card 200 recognize the memory card 200 as an AP and may be connected to the network formed by the memory card 200. In step S854, when the controller 201 detects a connection request transmitted from the cellular phone 300 through the communication unit 206 after the cellular phone 300 is connected to the network formed by the memory card 200, the process proceeds to step S855. In step S855, the memory card 200 responds to the connection request transmitted form the cellular phone 300 so that a connection is established. When the connection is established, the cellular phone 300 transmits a request for obtaining file information stored in the recording device 204 of the memory card 200.

In response to the request, the controller 201 transmits the information on the file stored in the recording device 204 to the cellular phone 300 through the communication unit 206. Subsequently, in step S856, the cellular phone 300 displays the information on the file in the display unit 306 using the file information, selects a file to be transmitted by operating the operation unit 305, and transmits an image obtaining request to the memory card 200 through the communication unit 310. When the controller 201 of the memory card 200 receives the image obtaining request through the communication unit 206, the process proceeds to step S857. In step S857, the controller 201 reads the file requested in step S856 from the recording device 204 into the work memory 203 and transmits the file to the cellular phone 300 through the communication unit 206. In step S858, when the controller 201 detects an instruction for stopping the communication function supplied from the digital still camera 100, the process proceeds to step S859. In step S859, the controller 201 disables the communication function of the communication unit 206 so that the controller 201 may not communicate with the cellular phone 300 through the communication unit 206. In step S860, when power-off is detected, the process is terminated.

The flowchart illustrating the operation of the memory card 200 in the manual transmission mode has been described hereinabove.

As described above, in the memory card 200 in the manual transmission mode, the memory card 200 does not determine a file to be transmitted but the user selects an image to be transmitted using the cellular phone 300 and transmits the image. Therefore, a user operation may be waited for a long period of time while the connection is maintained. Therefore, if disconnection occurs every time imaging is performed, a user operation may not be performed. On the other hand, in the memory card 200 in the automatic transmission mode, the memory card 200 determines an image to be transmitted and transmits the image to an apparatus of a connection destination recorded in advance. Therefore, even if transfer is suddenly interrupted, transmission of an image may be restarted without a user operation. Accordingly, as illustrated in FIG. 5, in the case where the memory card 200 is in the automatic transmission mode in imaging performed using the digital still camera 100, communication is interrupted, whereas in the case where the memory card is in the manual transmission mode in the imaging performed using the digital still camera 100, the communication is not interrupted. By this, when the memory card 200 in the automatic transmission mode is being attached, noise may not be generated in data to be recorded, such as a captured image, due to communication, whereas when the memory card 200 in the manual transmission mode is being attached, a function of not preventing the communication from being performed may be provided.

Note that, in the automatic transmission, the memory card 200 actively or spontaneously starts transmission even if a request is not received from another apparatus, and therefore, the automatic transmission may be referred to as "transmission in an active manner" (or "active transmission") or "transmission in a spontaneous manner" (or "spontaneous transmission"). Furthermore, in the manual transmission, the memory card 200 passively starts transmission in response to a request transmitted from another apparatus, and therefore, the manual transmission may be referred to as "transmission in a passive manner" (or "passive transmission").

Second Embodiment

In the first embodiment, the methods for controlling communication functions of the two types of recording medium having different transmission modes have been described. In a second embodiment, a method for controlling a communication function of a recording medium which may be operated in two different transmission modes, that is, automatic transmission and manual transmission, will be described.

FIG. 9 is an image diagram illustrating a method for obtaining a transmission mode of a memory card 200 and a method for changing the transmission mode of the memory card 200 employed in the memory card 200 capable of operating in two different types of transmission mode.

Obtainment and Change of Transmission Mode

First, a method for obtaining a transmission mode of the memory card 200 will be described. A digital still camera 100 transmits a request for obtaining a transmission mode to the attached memory card 200 through an interface 110. The memory card 200 reads the transmission mode recorded in a nonvolatile memory 202 and transmits the transmission mode to the digital still camera 100 through an interface 205. The nonvolatile memory 202 of the memory card 200 which supports a plurality of transmission modes records a selected one of the plurality of transmission modes supported by the memory card 200. In this embodiment, one of an automatic transmission mode and a manual transmission mode is set and recorded. Although the transmission mode is transmitted when the memory card 200 responds to the obtaining request transmitted from the digital still camera 100 in this embodiment, the scope of the present disclosure is not limited to this. A file recording the transmission mode may be stored in a recording device 204 of the memory card 200 and the transmission mode may be obtained when the digital still camera 100 reads the file. A cellular phone 300 (displayed as an external apparatus in FIG. 9) is connected to a network formed by the memory card 200 (or a network to which the memory card 200 is connected) through a communication unit 310 so as to be connected to the memory card 200. The cellular phone 300 transmits a transmission mode obtaining request to the memory card 200 through the communication unit 310. The memory card 200 reads the transmission mode recorded in the nonvolatile memory 202 and transmits the transmission mode to the cellular phone 300 through a communication unit 206.

Next, a method for changing a transmission mode of the memory card 200 will be described. When the user instructs a change of a transmission mode through the operation unit 105, the digital still camera 100 issues an instruction for changing a transmission mode to the memory card 200 attached through the interface 110. The memory card 200 updates the transmission mode recorded in the nonvolatile memory 202 by a newly specified transmission mode in response to the instruction for changing a transmission mode so as to change the transmission mode. In this way, the transmission mode may be changed by operating the digital still camera 100.

Alternatively, the transmission mode may be changed using the cellular phone 300. In this case, the cellular phone 300 is connected to a network formed by the memory card 200 through a communication unit 310 so as to be connected to the memory card 200. The cellular phone 300 transmits a transmission mode changing request to the memory card 200 through the communication unit 310. The memory card 200 updates the transmission mode recorded in the nonvolatile memory 202 so as to change the transmission mode.

Hereinafter, a method for controlling a communication function when the memory card 200 is attached to the digital still camera 100 according to the second embodiment and communication is performed with the cellular phone 300 will be described with reference to FIGS. 10, 11, 12A, 12B, and 13.

Processing of Digital Still Camera

Figure 10:
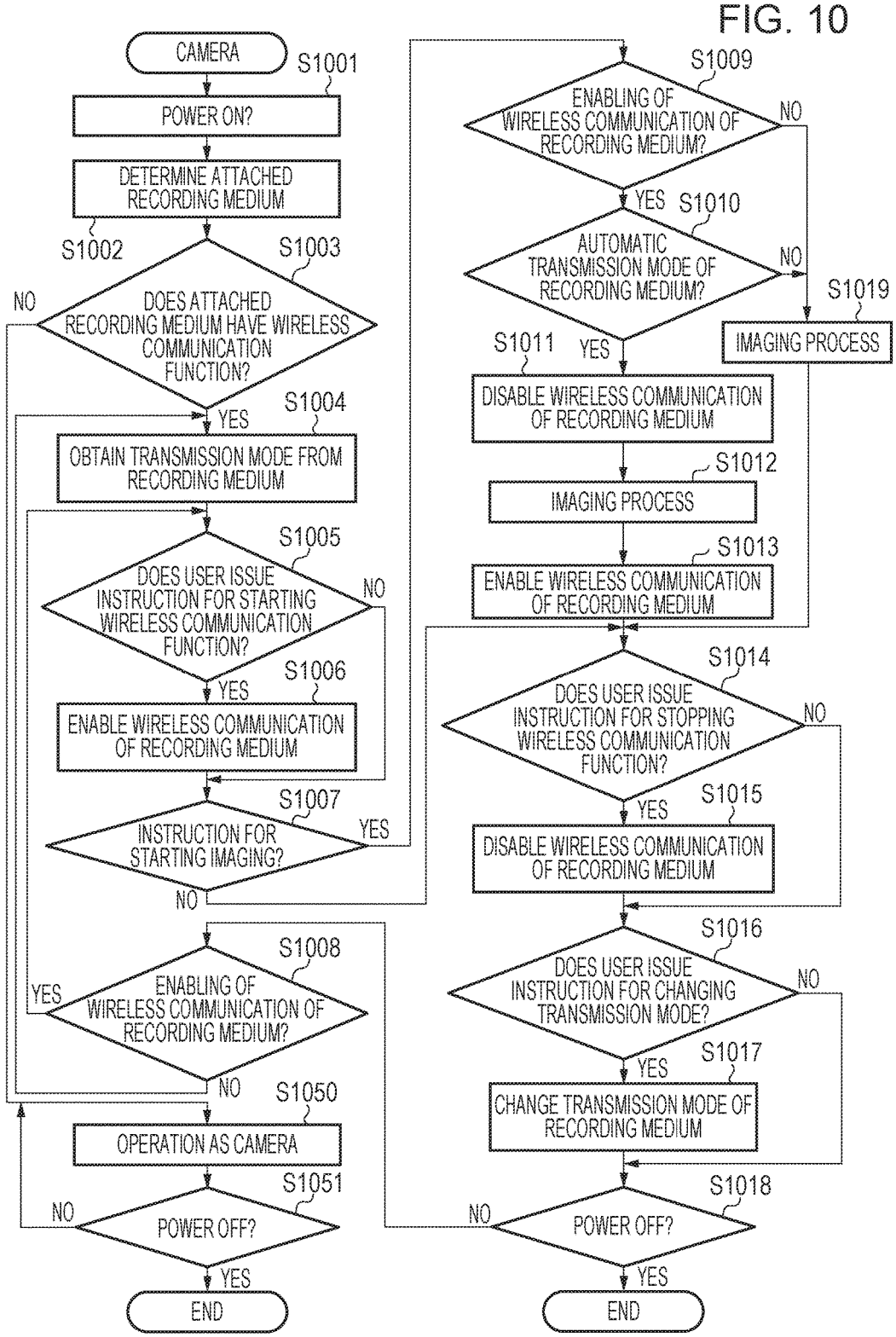
FIG. 10 is a flowchart illustrating an operation of a digital still camera according to the second embodiment.

FIG. 10 is a flowchart of an operation of the digital still camera 100 when the memory card 200 is attached to the digital still camera 100 according to the second embodiment and communication is performed with the cellular phone 300. In this embodiment, a recording medium capable of operating in two different transmission modes may be attached to the digital still camera 100. Furthermore, a recording medium which does not have a communication function may be attached to the digital still camera 100.

First, in step S1001, when the user operates the operation unit 105, the digital still camera 100 is powered and the processing is started. In step S1002, the controller 101 determines a transmission mode of the memory card 200 attached to the digital still camera 100 through the interface 110 and records the determined transmission mode in a work memory 104. A method for the determination will be described hereinafter with reference to FIG. 11.

Example of Correspondence Table

FIG. 11 is an example of a correspondence table in which a product name (CID: ProductName) recorded in the nonvolatile memory 202 of the memory card 200 is associated with a transmission mode. The digital still camera 100 records the correspondence table illustrated in FIG. 11 in a nonvolatile memory 103, reads a product name of the memory card 200 so that a transmission mode of the attached memory card 200 is determined with reference to the correspondence table. For example, in a case where the product name of the memory card 200 is "CCC", it is determined that the memory card 200 may be operated in the two different types of transmission mode. In a case where the product name is "AAA", it is determined that the memory card 200 is the automatic transmission mode, whereas in a case where the product name is "BBB", it is determined that the memory card 200 is in the manual transmission mode. If the memory card 200 supports only one of the automatic transmission mode and the manual transmission mode, a file is transmitted in accordance with the procedure described in the first embodiment. In this case, the process is branched to step S504 of FIG. 5, for example. On the other hand, if the product name is not "AAA", "BBB", nor "CCC", it is determined that the memory card 200 is a recording medium which does not have a communication function.

In step S1003, when determining that the memory card 200 has a communication function, the controller 101 proceeds to step S1004, and otherwise, the controller 101 proceeds to step S1050. In step S1050, the digital still camera 100 does not control the communication function of the memory card 200 but only operates as a normal camera which performs imaging, image recording, and the like. On the other hand, when determining that the memory card 200 has a communication function, the digital still camera 100 changes menu display for setting the communication function of the memory card 200 in accordance with the transmission mode of the memory card 200 attached through the interface 110. An example of the menu display according to this embodiment will be described with reference to FIGS. 12A and 12B.

Example of Menu Display

Figure 12A:
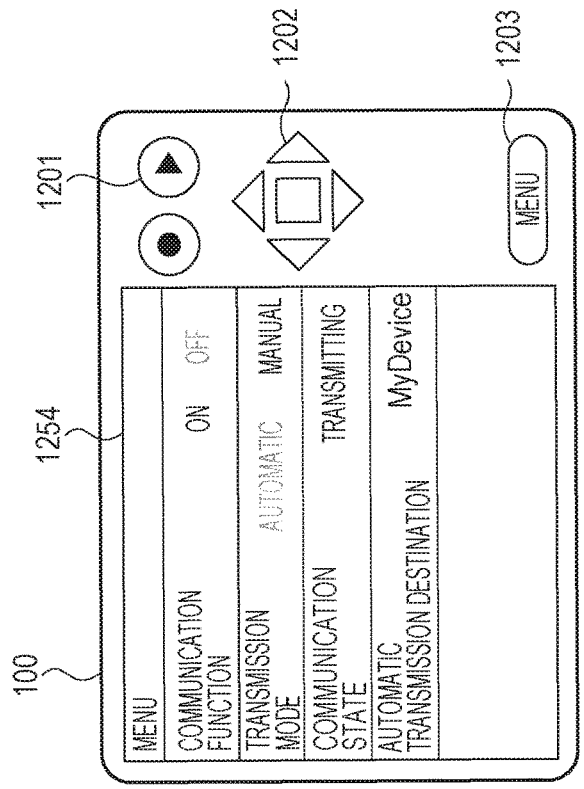
FIGS. 12A and 12B are diagrams illustrating display screens of the digital still camera according to the second embodiment.
Figure 12B:
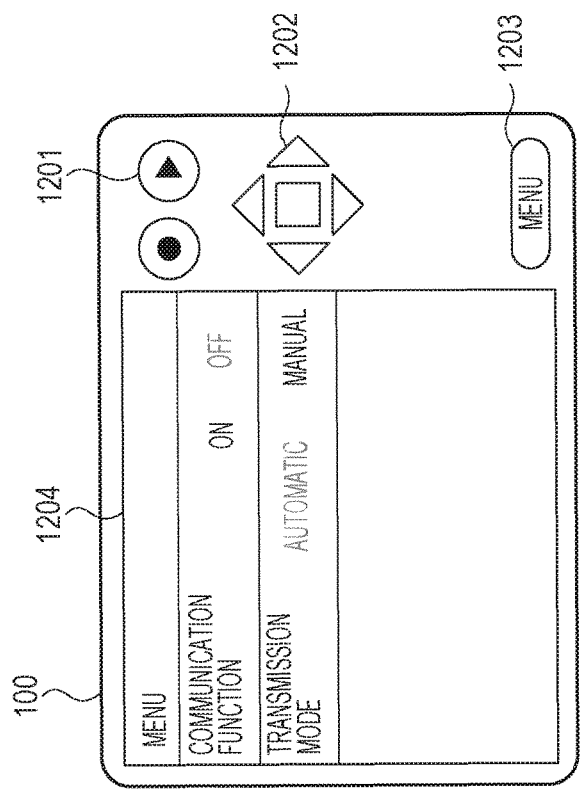

FIGS. 12A and 12B are diagrams illustrating the menu display for setting the communication function and the transmission mode of the memory card 200 of the digital still camera 100. FIG. 12A is a diagram illustrating the menu display displayed in a case where the transmission mode recorded in the memory card 200 attached to the digital still camera 100 is the manual transmission. Buttons 1201 to 1203 are included in an operation unit 105 which accepts user operations. The buttons 1201 to 1203 are the same as the buttons 701 to 703 of the first embodiment, and therefore, descriptions thereof are omitted. A screen 1204 displays an enabling state or a disabling state of the communication function of the memory card 200 so that the communication function is set by operating the button 1202. Furthermore, the screen 1204 displays the manual transmission mode or the automatic transmission mode set in the memory card 200 so that the transmission mode of the memory card 200 is set by operating the button 1202.

FIG. 12B is a diagram illustrating the menu display displayed in a case where the transmission mode of the memory card 200 attached to the digital still camera 100 is the automatic transmission. The buttons 1201 to 1203 are the same as those of FIG. 12A, and therefore, descriptions thereof are omitted. The screen 1254 displays, in addition to the components displayed in the screen 1204, a communication state of the memory card 200 and a transmission destination. In the screen 1204 described above, when the transmission mode is changed from the manual transmission to the automatic transmission, the screen 1254 is displayed. When the transmission mode is changed from the automatic transmission to the manual transmission, the screen 1204 is displayed. A method for obtaining the transmission mode and a method for setting the transmission mode for display and setting of the transmission mode in the screens 1204 and 1254 will be described later.

Referring back to FIG. 10, a loop starting from step S1005 and returning back to step S1005 through step S1007, step S1014, step S1016, step S1018, and step S1008 is formed as a loop for waiting for an instruction by a user operation unless otherwise specified. In this loop, an instruction by a user operation is waited, and if an instruction is input, a process corresponding to the instruction is performed in the procedure of FIG. 10. The waiting for an instruction is not limited to the loop, and the process in FIG. 10 may be restarted in accordance with an instruction after the process is stopped, and the process may be branched in accordance with content of the instruction.

In step S1004, the controller 101 obtains a transmission mode of the memory card 200 through the interface 110 and records the transmission mode in the work memory 104. In step S1005, when the controller 101 detects that an instruction for enabling the communication function of the memory card 200 has been issued by the user operating the operation unit 105 in the menu screen described above, the process proceeds to step S1006. Subsequently, in step S1006, the controller 101 performs an instruction for enabling the communication function to the memory card 200 through the interface 110. Although enabling or disabling of the communication function of the memory card 200 is instructed by a user operation in this embodiment, the scope of the present disclosure is not limited to this. For example, a setting value indicating enabling or disabling of the communication function may be recorded in the nonvolatile memory 103, and when it is determined that the memory card 200 has the communication function, the controller 101 may read the setting value from the nonvolatile memory 103 so that an instruction is issued to the memory card 200. Furthermore, although the communication function of the memory card 200 is started in response to an instruction supplied from the digital still camera 100 in this embodiment, the scope of the present disclosure is not limited to this. For example, an initial value of the operation of the communication function of the memory card 200 may be recorded in the nonvolatile memory 202, and the controller 201 may read the initial value of the communication function recorded in the nonvolatile memory 202 when the memory card 200 is powered so as to perform switching between enabling and disabling of the communication function. As described above, in the configuration in which the memory card 200 makes a determination for changing the communication function, an instruction supplied from the digital still camera 100 in step S1005 is not required. In a case of a recording medium which does not require such an instruction, the process proceeds to step S1007 if the recording medium has been attached.

Next, in step S1007, when determining that an instruction for starting imaging has been issued, the controller 101 proceeds to step S1009. If imaging is performed during transfer, noise may be generated. To prevent generation of noise, the communication function may be turned off in imaging. However, sudden interruption of transmission of an image may cause problems. In particular, in a case of the manual transmission mode as illustrated in FIG. 12A, a user operation may be waited for a long period of time while connection is maintained, and therefore, if disconnection occurs every time imaging is performed, a user operation may not be performed. Therefore, in this embodiment, communication is continued in the imaging in the manual transmission mode, whereas communication is disabled in imaging in the automatic transmission mode. A control method thereof will be described in step S1009 to step S1019.

In step S1009, the controller 101 determines whether the communication function of the memory card 200 is enabled through the interface 110. When the communication function is not enabled, the communication function is not required to be disabled. Therefore, in step S1019, the controller 101 performs a predetermined imaging process through the imaging unit 102 and stores image data in the memory card 200 through the interface 110. On the other hand, when the communication function is enabled, the process proceeds to step S1010. In step S1010, the controller 101 reads a transmission mode of the memory card 200 from the work memory 104. In the case of the manual transmission mode of the memory card 200, the communication function is not disabled so that a user operation is not prevented from being performed on an apparatus of a connection destination. In step S1019, the controller 101 performs the predetermined imaging process through the imaging unit 102 and stores image data in the memory card 200 through the interface 110. In the case of the automatic transmission mode of the memory card 200, the process proceeds to step S1011. In step S1011, the controller 101 issues an instruction for disabling the communication function of the memory card 200 through the interface 110 so that noise is not generated in a captured image due to the communication. Thereafter, in step S1012, the controller 101 performs a predetermined imaging process through the imaging unit 102 and stores image data in the memory card 200 through the interface 110. Thereafter, in step S1013, the controller 101 issues an instruction for enabling the communication function to the memory card 200 again through the interface 110 so that the communication is restarted. In step S1014, when the controller 101 detects that an instruction for disabling the communication function of the memory card 200 has been issued by the user operating the operation unit 105, the process proceeds to step S1015. Subsequently, in step S1015, the controller 101 performs an instruction for disabling the communication function to the memory card 200 through the interface 110.

In step S1016, when the user instructs change of a setting of the transmission mode in the menu screen 1204 or 1254 illustrated in FIG. 12A or FIG. 12B, the process proceeds to step S1017. In step S1017, the controller 101 changes the transmission mode of the memory card 200 through the interface 110. Although the transmission mode is changed in accordance with the instruction of the user in this embodiment, the scope of the present disclosure is not limited to this and the transmission mode may be changed in accordance with a determination performed by the digital still camera 100. For example, in a case where imaging is performed in an imaging mode for a predetermined period of time, it may be determined that the user is not performing an operation in an apparatus of a connection destination and the controller 101 may set the automatic transmission mode of the memory card 200 through the interface 110. Furthermore, in moving-image shooting, noise is more likely to be generated when compared with still-image shooting, and therefore, when start of moving-image shooting is detected, the controller 101 may set the automatic transmission mode of the memory card 200 through the interface 110. In step S1018, when the controller 101 detects power-off of the digital still camera 100 performed by the user operating the operation unit 105, the process is terminated.

Processing of Memory Card

Figure 13:
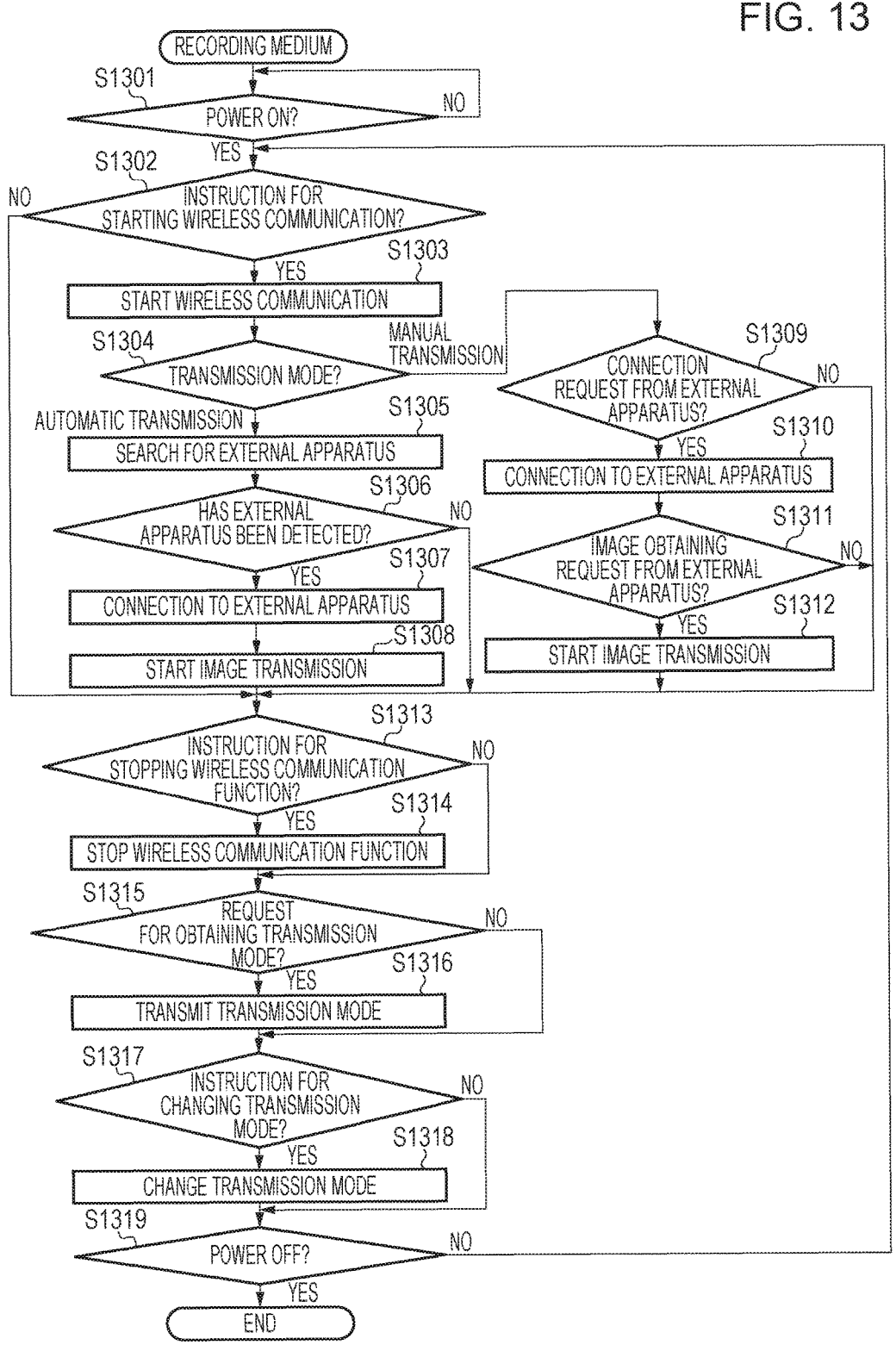
FIG. 13 is a flowchart illustrating an operation of a memory card according to the second embodiment.

FIG. 13 is a flowchart of an operation of the memory card 200 when the memory card 200 is attached to the digital still camera 100 according to the second embodiment and communication is performed with the cellular phone 300. In the first embodiment, the methods for controlling communication functions of recording media of the two types of recording medium having different transmission modes have been described. In this flowchart, a method for controlling a communication function of the memory card 200 which may be operated in two different transmission modes will be described. The recording medium which does not have a communication function only has a function of inputting/outputting and recording data output from the digital still camera 100 through an interface, and therefore, as with the first embodiment, a description thereof is omitted. In the automatic transmission mode, although the memory card 200 capable of operating in the two different transmission modes requires recording of information on an apparatus of a connection destination in the nonvolatile memory 202 in advance, it is assumed that the information on the apparatus of the connection destination has been recorded in this flowchart.

First, in step S1301, when power-on of the controller 201 is detected, processing is started. In step S1302, when the controller 201 detects an instruction for starting the communication function supplied from the digital still camera 100, the process proceeds to step S1303. Furthermore, although the communication function is started in response to the instruction supplied from the digital still camera 100 in this embodiment, the scope of the present disclosure is not limited to this. For example, an initial value of the operation of the communication function of the memory card 200 may be recorded in the nonvolatile memory 202, and the controller 201 may read the initial value of the communication function recorded in the nonvolatile memory 202 when the memory card 200 is powered so as to perform switching between enabling and disabling of the communication function.

In step S1303, the controller 201 enables the communication function of the communication unit 206 so that the controller 201 may communicate with the cellular phone 300 through the communication unit 206. Subsequently, in step S1304, when the automatic transmission mode is recorded in the nonvolatile memory 202, the controller 201 proceeds to step S1305, whereas when the manual transmission mode is recorded in the nonvolatile memory 202, the controller 201 proceeds to step S1309. In a process from step S1305 to step S1308, the memory card 200 serves as a recording medium in the automatic transmission mode. The process from step S1305 to step S1308 is the same as the process from step S804 to step S807 of FIG. 8A performed by the recording medium in the automatic transmission mode, and therefore, a description thereof is omitted. In a process from step S1309 to step S1312, the memory card 200 serves as a recording medium in the manual transmission mode. The process from step S1309 to step S1312 is the same as the process from step S854 to step S857 of FIG. 8B performed by the recording medium in the manual transmission mode, and therefore, a description thereof is omitted.

In step S1313, when the controller 201 detects an instruction for stopping the communication function supplied from the digital still camera 100, the process proceeds to step S1314. Furthermore, although the communication function is stopped in response to the instruction supplied from the digital still camera 100 in this embodiment, the scope of the present disclosure is not limited to this. For example, the communication function may be stopped after all files to be transferred are transmitted. In step S1314, the controller 201 disables the communication function of the communication unit 206 so that the controller 201 may not communicate with the cellular phone 300 through the communication unit 206. In step S1315, when the controller 201 receives a transmission mode obtaining request from the digital still camera 100 through the interface 205 or receives a transmission mode obtaining request from the cellular phone 300 through the communication unit 206, the process proceeds to step S1316. In step S1316, the controller 201 reads a transmission mode from the nonvolatile memory 202. When the transmission mode obtaining request is received from the digital still camera 100, the controller 101 notifies the digital still camera 100 of the transmission mode through the interface 110. When the transmission mode obtaining request is received from the cellular phone 300, the controller 101 notifies the cellular phone 300 of the transmission mode through the communication unit 206. In step S1317, when the controller 201 receives a transmission mode changing request from the digital still camera 100 through the interface 205 or receives a transmission mode changing request from the cellular phone 300 through the communication unit 206, the process proceeds to step S1318. In step S1318, the controller 201 updates the transmission mode recorded in the nonvolatile memory 202 so as to change the transmission mode. In step S1319, when power-off is detected, the process is terminated.

As described above, as for a memory card capable of using a selected one of an automatic transmission mode and a manual transmission mode as a transmission mode, a transmission mode set in the memory card is obtained. Then, as with the first embodiment, continuing or interrupting of data transmission in imaging may be controlled in accordance with the set transmission mode. Therefore, in a case where the transmission mode of the memory card or the set transmission mode is automatic transmission when imaging is performed by the digital still camera 100, communication is interrupted so that influence of noise is reduced whereas in a case where the transmission mode of the memory card is manual transmission, the communication is not interrupted but data transfer is preferentially performed. By this, when the memory card in the automatic transmission mode is being attached, noise may not be generated in a captured image due to communication, whereas when the memory card in the manual transmission mode is being attached, a function of not preventing the communication from being performed may be provided.

Although various embodiments are described in detail based on the preferred embodiments hereinabove, the scope of the present disclosure is not limited to the specific embodiments, and various embodiments may be included in the present invention without departing from the scope of the present invention. Portions of the foregoing embodiments may be appropriately combined. In the foregoing embodiments, when the transmission mode of the recording medium is determined as the automatic transmission, the communication function is disabled in imaging. However, the scope of the present disclosure is not limited to this. For example, even in the case of the manual transmission mode, only image transmission may be interrupted while the communication function is enabled so that imaging is not prevented from being performed. Furthermore, a case where a program of software which realizes the functions of the foregoing embodiments is directly supplied or supplied using wired/wireless communication from the recording medium to a system or an apparatus having a computer capable of executing the program and the program is executed is also included in the present invention. Accordingly, program codes supplied to or installed in the computer to realize a function process of the present invention by a computer also realize the present invention. Specifically, the computer program for realizing the function process of the present invention is also included in the present invention. In this case, the program may have any program form, such as an object code, a program to be executed by an interpreter, script data to be supplied to an OS, and the like. Example of the recording medium which supplies the program include hard disk, a magnetic recording medium, such as a magnetic tape, optical/magneto-optical storage medium, and a nonvolatile semiconductor memory. Furthermore, examples of the program supplying method include a method for storing a computer program included in the present invention in a server on a computer network and downloading the computer program by a connected client computer for programming.

Other Embodiments

Various embodiments of the present disclosure may be realized by supplying the program which realizes at least one of the functions of the foregoing embodiments to a system or an apparatus through a network or a storage medium and reading and executing the program by at least one of a computer included in the system or the apparatus. Furthermore, various embodiments of the present disclosure may be realized by a circuit (an application specific integrated circuit (ASIC), for example) which realizes at least one of the functions.

Various embodiments can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-246634, filed Dec. 17, 2015, which is hereby incorporated by reference herein in its entirety.

What is claimed is:

1. A data processing apparatus comprising:
a communication interface to which a recording medium having a communication function of transmitting stored data is attachable; and
a controller configured to record data captured in accordance with an imaging instruction in the recording medium in a case where the recording medium is attached, and
configured to specify a transmission mode of the recording medium in the case where the recording medium is attached and stop data transmission performed by the recording medium in accordance with the imaging instruction in a case of an automatic transmission mode for spontaneously transmitting data.

2. The data processing apparatus according to claim 1, wherein, in the case where the recording medium is attached, the controller disables the communication function of the recording medium in accordance with the imaging instruction if the recording medium is in the automatic transmission mode.

3. The data processing apparatus according to claim 1, wherein the controller enables the communication function after imaging in a case where communication performed by the communication function of the recording medium is stopped in accordance with the imaging instruction.

4. The data processing apparatus according to claim 1, wherein the controller does not control the communication function irrespective of the imaging instruction in a case where the specified transmission mode is the manual transmission mode for transmitting data in response to a request supplied from another apparatus connected to the recording medium.

5. The data processing apparatus according to claim 4, further comprising:

a correspondence table configured to store identification information of the recording medium and a transmission mode of the recording medium which are associated with each other,
wherein, when the recording medium is attached, the controller obtains the identification information of the recording medium from the recording medium, specifies the transmission mode associated with the identification information with reference to the correspondence table, and determines the specified transmission mode as a transmission mode of the recording medium.

6. The data processing apparatus according to claim 5, wherein, when a transmission mode of the recording medium is recorded in the recording medium, the controller obtains the transmission mode of the recording medium from the recording medium and specifies the transmission mode of the recording medium.

7. The data processing apparatus according to claim 6, wherein, in a case where the recording medium supports a plurality of transmission modes, the recording medium records transmission modes of the recording medium, and
when the recording medium is attached, the controller obtains the identification information of the recording medium from the recording medium, specifies a transmission mode associated with the identification information with reference to the correspondence table, and obtains a transmission mode of the recording medium from the recording medium if a plurality of transmission modes are recorded.

8. The data processing apparatus according to claim 7, further comprising:
a user interface configured to change the transmission mode of the recording medium in accordance with a user operation.

9. The data processing apparatus according to claim 1, further comprising:
a display unit configured to display enabling or disabling of the communication function of the recording medium.

10. The data processing apparatus according to claim 9, wherein the display unit further displays a communication state of the recording medium and a transmission destination of data recorded in the recording medium in a case where the recording medium is in the automatic transmission mode.

11. The data processing apparatus according to claim 1, wherein the controller enables or disables the communication function of the recording medium in accordance with a user's instruction.

12. The data processing apparatus according to claim 1, wherein the communication function performs wireless communication.

13. A non-transitory storage medium storing a program that causes a computer having a communication interface to which a recording medium having a communication function of transmitting stored data is attachable, to perform operations comprising:
recording data captured in accordance with an imaging instruction in the recording medium in a case where the recording medium is attached; and
specifying a transmission mode of the recording medium in the case where the recording medium is attached and stop data transmission performed by the recording medium in accordance with the imaging instruction in a case where the transmission mode is an automatic transmission mode for spontaneously transmitting data.

14. A method employed in a data processing apparatus having a communication interface to which a recording medium having a communication function of transmitting stored data is attachable, the method comprising:
  recording data captured in accordance with an imaging instruction in the recording medium in a case where the recording medium is attached; and
  performing control such that a transmission mode of the recording medium is specified in the case where the recording medium is attached and data transmission performed by the recording medium is stopped in response to the imaging instruction in a case where the transmission mode is an automatic transmission mode for spontaneously transmitting data.

15. A data processing apparatus comprising:
  an interface to which a recording medium having a communication function of transmitting stored data in the recording medium is attachable;
  a recorder configured to record data captured in accordance with an imaging instruction in the recording medium attached to the interface; and
  a controller configured to specify a transmission mode of the attached recording medium and to disable the communication function of transmitting data of the attached recording medium in a case where the specified transmission mode is an automatic transmission mode for spontaneously transmitting data.

16. The data processing apparatus according to claim 15, wherein the controller enables the communication function after imaging in a case where communication performed by the communication function of the recording medium is disabled in accordance with the imaging instruction.

17. The data processing apparatus according to claim 15, wherein the controller does not control the communication function irrespective of the imaging instruction in a case where the specified transmission mode is the manual transmission mode for transmitting data in response to a request supplied from another apparatus connected to the recording medium.

18. The data processing apparatus according to claim 15, wherein the communication function performs wireless communication.

19. A method employed in a data processing apparatus having an interface to which a recording medium having a communication function of transmitting stored data in the recording medium is attachable, the method comprising:
  recording data captured in accordance with an imaging instruction in the recording medium attached to the interface; and
  performing control such that a transmission mode of the attached recording medium is specified and the communication function of transmitting data of the attached recording medium is disabled in a case where the specified transmission mode is an automatic transmission mode for spontaneously transmitting data.

* * * * *